Feb. 20, 1940.  J. S. CLAPPER  2,191,426
MOWING IMPLEMENT
Original Filed March 16, 1936    6 Sheets-Sheet 1
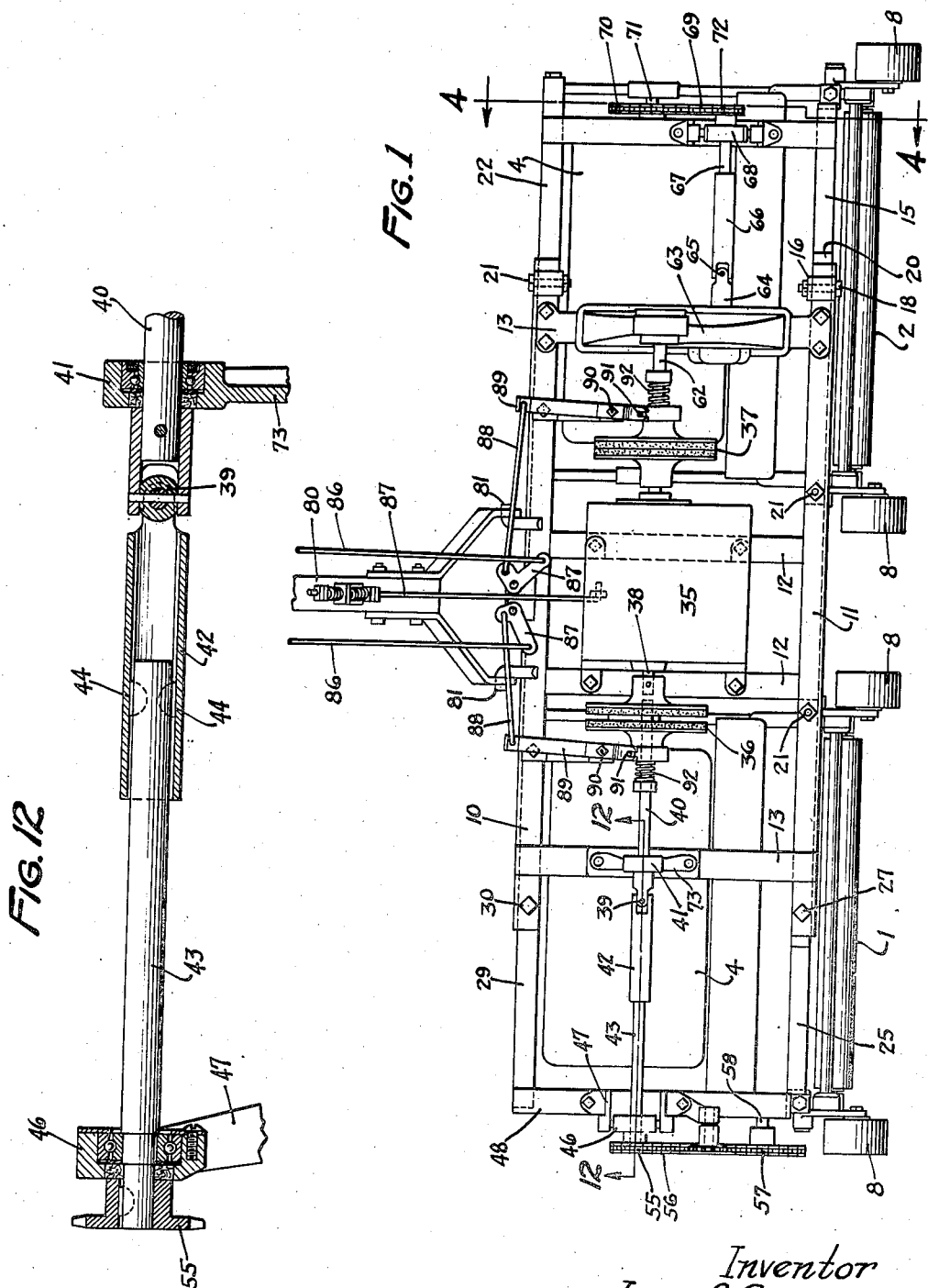
Inventor
JOHN S. CLAPPER
ATTORNEYS Feb. 20, 1940. J. S. CLAPPER 2,191,426
MOWING IMPLEMENT
Original Filed March 16, 1936 6 Sheets-Sheet 2
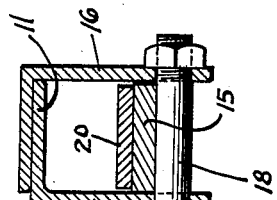
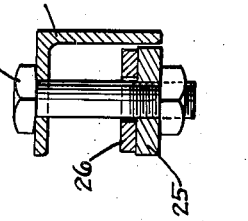
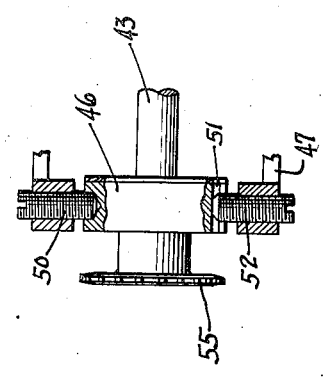
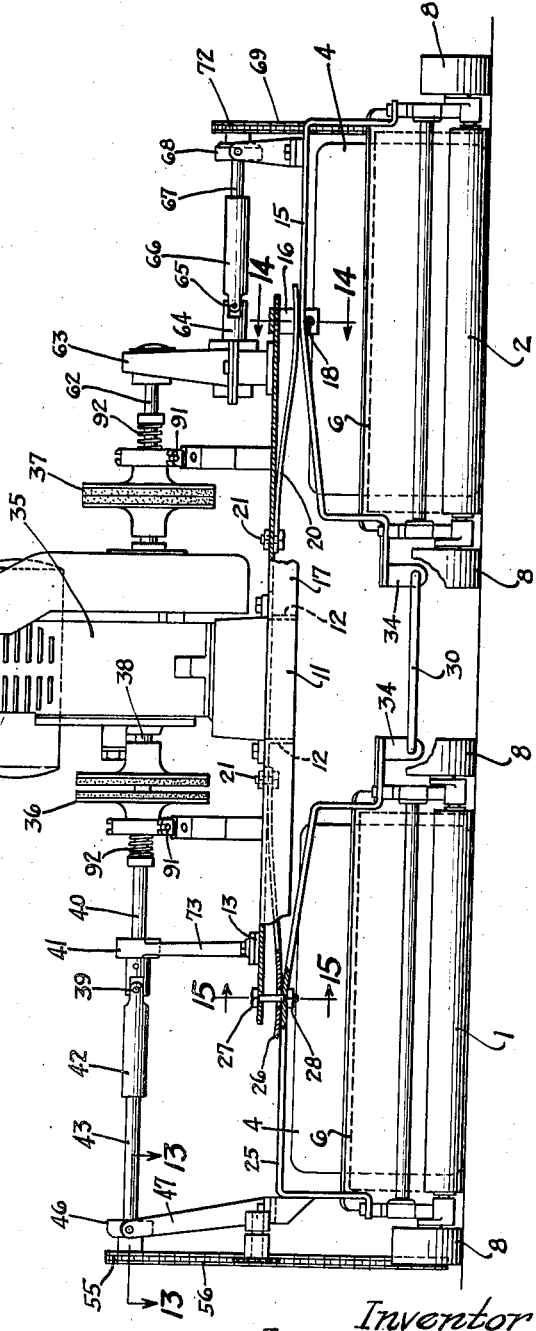
Inventor
JOHN S. CLAPPER
By Paul, Paul & Moore
ATTORNEYS Feb. 20, 1940. J. S. CLAPPER 2,191,426
MOWING IMPLEMENT
Original Filed March 16, 1936 6 Sheets-Sheet 3

Inventor
JOHN S. CLAPPER
By Paul, Paul Moore
ATTORNEYS

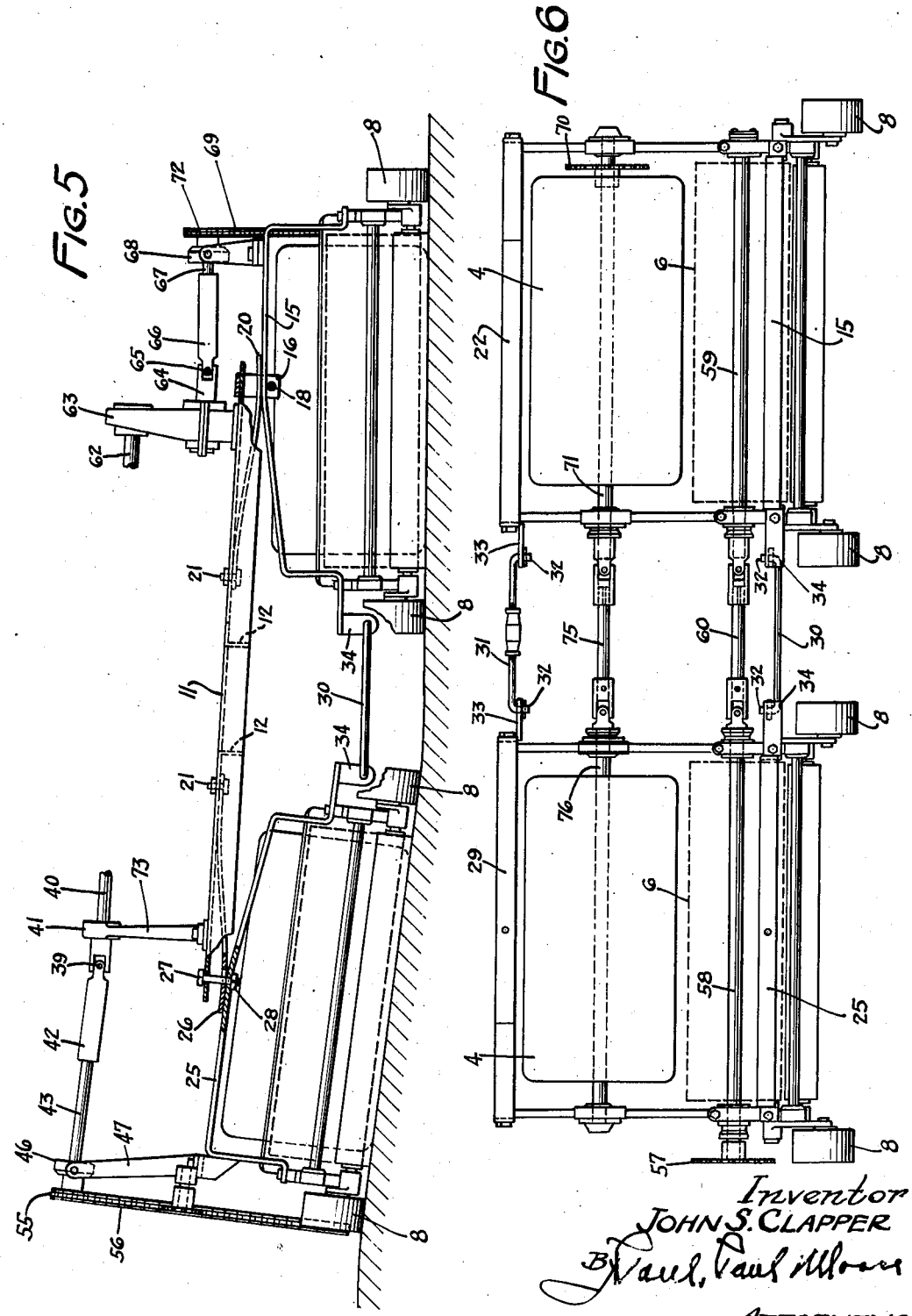

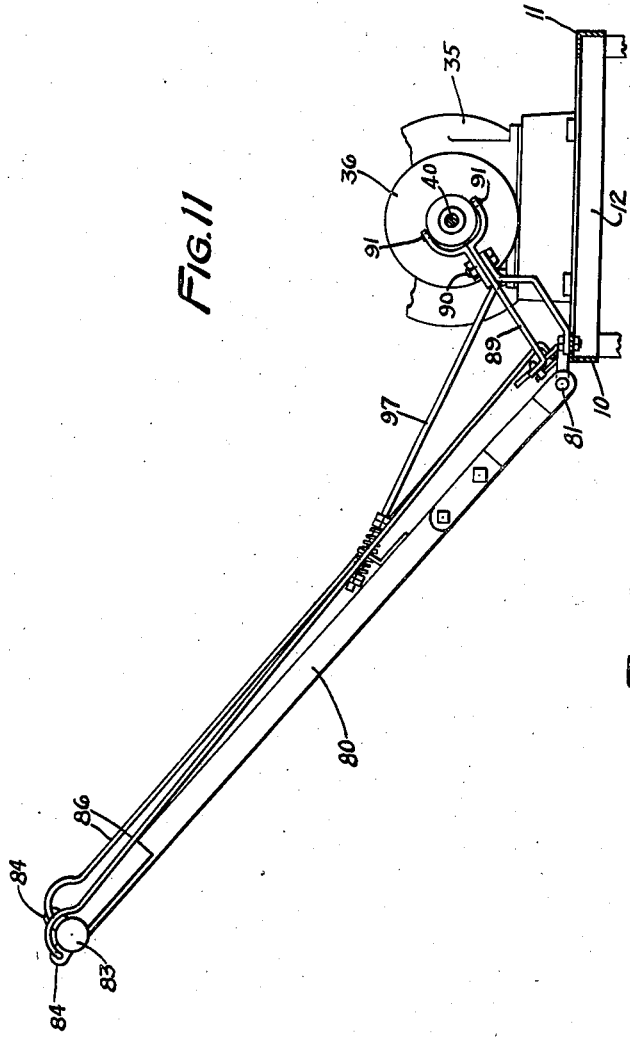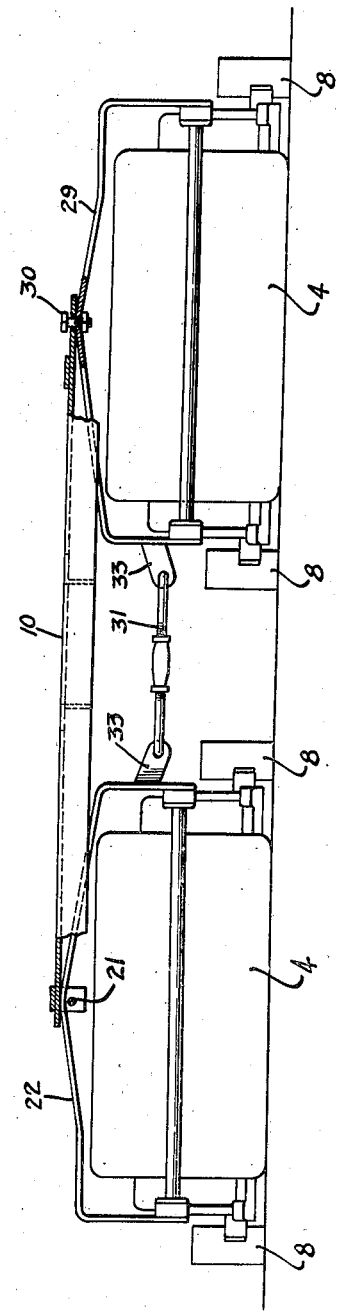

Feb. 20, 1940.  J. S. CLAPPER  2,191,426
MOWING IMPLEMENT
Original Filed March 16, 1936    6 Sheets-Sheet 6
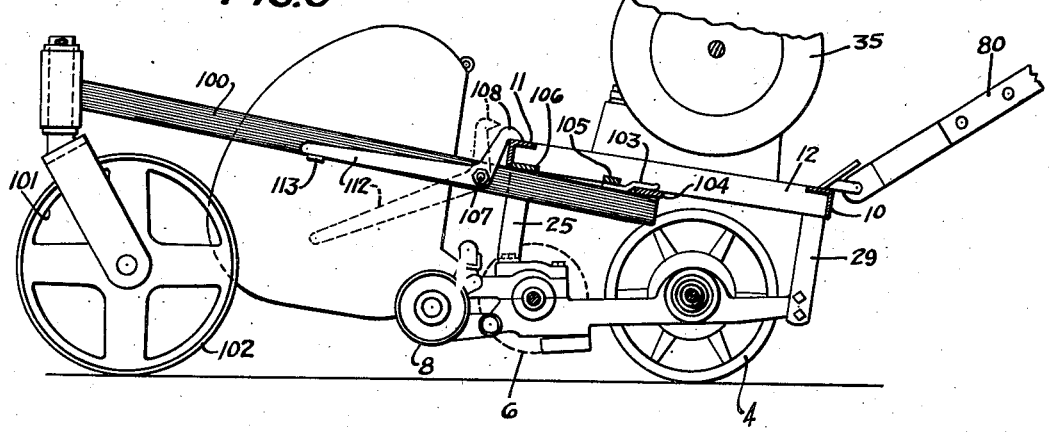
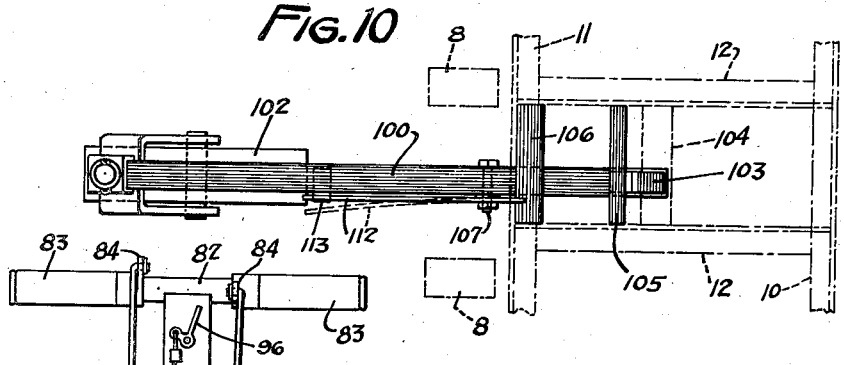
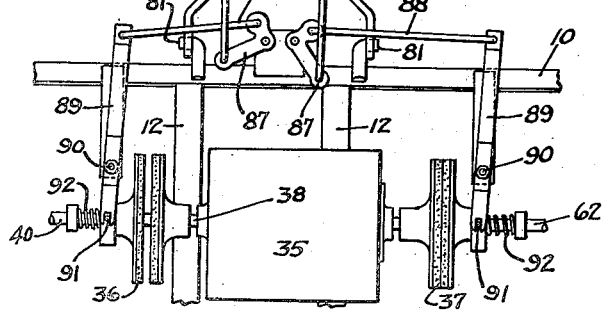
Inventor
JOHN S. CLAPPER
By Paul, Paul Moore
ATTORNEYS Patented Feb. 20, 1940

2,191,426

UNITED STATES PATENT OFFICE 2,191,426

MOWING IMPLEMENT

John S. Clapper, Minneapolis, Minn., assignor to Toro Manufacturing Corporation of Minnesota, Minneapolis, Minn., a corporation of Minnesota Application March 16, 1936, Serial No. 69,180
Renewed January 24, 1938

24 Claims. (Cl. 56—7)

This invention relates generally to improvements in mowing implements and also to a mowing implement which is particularly adapted for mowing the greens of golf courses. For mowing greens, it is of course desirable, and it is an object of this invention to so construct and so operate the machine as to obtain maximum cutting and speed efficiency with a minimum of injury to the grass.

Heretofore it has been the general practice to use more than two units and to arrange the units to cut overlapping swaths. One of the objections to the use of such an implement is that it is more difficult to make the turns at the ends of the cuts. At the present time it is the accepted method of mowing golf greens to mow by going back and forth in opposite directions giving a cut in which alternate swaths are cut in opposite directions throughout the whole width of the green. This going back and forth on the green in opposite directions necessitates, at the end of each cut, the turning of the machine through an angle of 180° before starting back in the opposite directions. This invention provides an implement which can be easily turned without injury to the green.

A feature of this invention is an implement having only two mowers held in spaced relation by suitable spacing means to which they are attached for rocking movement substantially in a vertical plane which is transverse to the direction of travel.

Another feature relates to the method of driving the mowers, in which the rolling elements or driving drums of the mowers are separately driven and in which the cutters are separately driven, so that cutter operation can be discontinued, while the drums are operated to drive the implement from one green to another.

Another feature relates to the driving of one cutter by the other through a shaft connection lying between the inner ends of the units and so constructed as to allow the units to rock in the aforesaid plane which is perpendicular to the direction of motion, along with similar means for driving one drum by the other.

Features include all details of construction relating to the mounting and movements of the units and the mounting and motions of the driving connections, along with all the broader ideas of means inherent in the disclosure, including combinations and sub-combinations of the parts.

Objects, features and advantages of the invention will be set forth in the description of the drawings forming a part of this application, and in said drawings Figure 1 is a top plan view, showing the cutter clutch open or out, and the drum clutch closed or in;

Figure 2 is a front elevation partly in section showing the yielding pivoted and yielding sliding connections between the frame and the front sides of the mower units;

Figure 5 is a front elevation illustrating the action of the units to independently move in conformity to ground contours;

Figure 6 is a top plan of the units with the spacing means or connecting frame removed, and showing the through driving connections from one cuter reel to the other and from one drum to the other, along with the aligning links;

Figure 7 is a rear elevation, partly in section, showing the yielding pivoted and sliding connections between the frame and the rear sides of the units;

Figure 8 is a top plan view illustrating the arrangement of the grip or handle-operated clutch control elements and their clutches;

Figure 9 is a vertical transverse section illustrating a quickly attachable and detachable wheel-providing means by which the cutters are raised and held raised preparatory to and during transportation from one green to another;

Figure 10 is a top plan view of part of the attachment of Figure 9;

Figure 11 is a side elevation further illustrating the connections for the grip or handle-operated clutch control elements;

Figure 12 is a detail vertical section on line 12—12 of Figure 1;

Figure 13 is a horizontal section on line 13—13 of Figure 2;

Figure 14 is a vertical detail section on line 14—14 of Figure 2 illustrating the sliding and pivotal connection of one of the units with the spacing means or frame; and Figure 15 is a vertical detail section on line 15—15 of Figure 2 illustrating the pivotal connection of the other unit with the spacing means.

Figure 3:
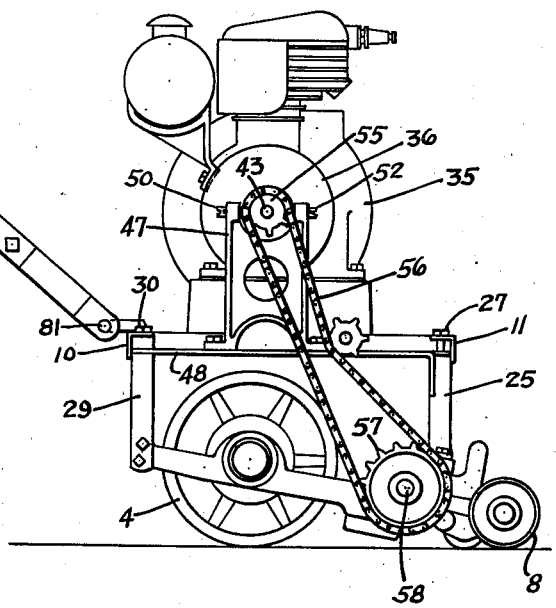
Figure 3 is an end elevation looking from the left side of Figure 1 or from the left side of Figure 2.

Referring first to Figures 1 and 2: The numeral 1 generally designates the right-hand mower and numeral 2 the left-hand mower. These mowers will be hereinafter referred to as units and each unit is provided with a rolling support 4 in this instance having a form of a drum. Each unit is also provided with a cutter indicated in dotted lines at 6. It will be understood that each unit is provided with the usual means for regulating the length or degree of the cut, this means including rollers 8 attached to the usual levers which are pivoted for adjustment, and which have means by which fine and accurate depth adjustment can be made. With the exception that the drums or rolling elements do not operate the cutters, the construction of each unit is standard and since this standard construction is not claimed herein, no detailed description of its parts is given.

The units are aligned in a direction transverse to their direction of travel, and their inner ends generally have the spaced relation shown, although the degree of spacing may be varied. A spacing and connecting means for the units, in this instance, comprises a frame, see Figure 2, composed essentially of six principal frame elements, two elongated elements, front and rear, respectively indicated at 10 and 11, and four additional elements symmetrically arranged at each side of the middle of the elements 10 and 11. Two of these elements are indicated at 12 and are arranged near to and one at each side of the middle and two others are indicated at 13 and are arranged near the ends of elements 10 and 11. The members 12 are angle irons; the members 13 are bars.

Means for each unit is provided connecting it to the spacing means or frame to permit independent movements of the unit conformably to ground contours. Referring to Figures 2 and 13: One of the units, in this instance the left-hand unit, is pivotally slidably connected to the transverse elements 10 and 11 in a manner to allow sliding movement lengthwise of said elements or in a direction transverse to the line of travel, and to allow rocking movement in a vertical plane which is transverse to the line of travel, but to substantially prevent rotative movement about a vertical axis, so that the mower is held square with the line of movement. Means is also provided for yieldably holding the mowers against rise but permitting them to rise conformably to ground contours. This yielding means also supports the bar 11 in a position spaced upwardly from the cross bars on the units, now to be described. The left-hand unit is provided at its front with a longitudinally extending cross-bar 15. A bracket 16 is attached near the end of the front bar 11 and has a downwardly extending portion which forms with the vertical flange 17 of the frame bar 11, a pocket or fork into and through which the element 15 extends. A bolt 18 passes horizontally through the depending portions of the bracket 16 and flange 17. A leaf spring 20 is attached as at 21 to the horizontal flange of the bar 11, and extends, as shown, and has its outer end normally spaced downwardly from the horizontal flange of the bar 11 to bear against the upper surface of the bar 15 so that normally the bar is pressed into engagement with the cross-bolt 18. From this it will be seen that the mower 2 can move lengthwise and that it can move upwardly against the action of the spring 20, when ground contour demands such movement.

By referring to Figure 7 it is seen that the rear side of the left-hand unit is also rockingly and slidably connected to the rear bar 10, in substantially the same manner previously described, with the exception that no spring is here used. This connection is generally designated by numeral 21, and the cross bar of the unit by numeral 22.

Referring to Figures 2 and 15: The unit 1 or right-hand unit is pivotally attached and has a front bar 25 similar to bar 15. Passing through an opening in the top flange of the member 11, and through an opening in spring 26 and also through an opening in the bar 25, is a pivot bolt 27. The spring is connected as at 21 to the upper flange of the bar 11 and acts in the same manner as spring 20 to hold the lower side of the bar 25 against the nut 28 of the bolt 27. The right-hand unit, see Figure 7, has at its rear a cross-bar 29 corresponding to cross-bar 22 of the left-hand unit, and the connection between the bar 10 of the frame and this bar 29 is made by means of the bolt 30. The spring is omitted here, as for the connection 21. Each unit is thus attached at two points to the frame, and these points of attachment are spaced and aligned in direction of travel of the unit.

Referring to Figure 6: It is noted that the units are connected together respectively at their forward and rear sides by means of rods provided with turn buckles. The front connection is indicated at 30, and the rear connection is indicated at 31. The bars have in-turned ends 32 which pass through and swing in openings, in pairs of brackets 33—34. The brackets 34 are attached to or are extensions of bars 15 and 25 and the brackets 33 are attached to or made extensions of cross-bars 22 and 29 at the rear of the units. These connections 30—31 provide means whereby rocking movement of the right-hand unit, see Figure 5, can cause the left-hand unit to slide at its points of connection with the frame.

An important feature of this invention relates to the manner of separately driving both drums, and both reels. Referring to Figures 1, 2, 3 and 4, and first to Figure 1: Numeral 35 generally indicates an engine or motor of any preferred type capable of providing power for operating the drums and the cutters. The motor is mounted on the cross irons 12. The drive shaft of the motor has associated therewith, one at each side of the motor, clutches respectively indicated at 36—37. One of the clutch elements is keyed to the drive shaft 38 of the engine and the other clutch element is splined to a shaft 40 journaled in the companion clutch element and in a suitable bearing 41 on cross-bar 13. Connected with the shaft 40 by means of a universal joint 39 is a sleeve 42 which is splined to a shaft 43. Referring to Figure 12: It will be noted that the shaft 43 and sleeve 42 are splined as at 44 whereby a sliding driving connection is provided.

The outer end of the shaft 43 is held in a bearing 46, see also Figure 13, the bearing being held by a bracket 47 on a cross-bar 48 of the unit which bridges the bars 25 and 29. This bearing is capable of slight swinging movement in a horizontal plane, conformably to similar motions of the right-hand unit. To this end, the bearing is held at one side in its bracket, by a trunnion 50 and is slotted at its opposite side as at 51 to slidably receive the end of a set screw 52.

Referring to Figure 3: Attached to the outer end of the shaft 43 is a sprocket wheel 55 connected by chain 56 to another sprocket 57 on the shaft 58 of the cutter reel of the right-hand unit. Referring now to Figure 6: The shaft 58 of this reel is connected to the shaft 59 of the cutter reel of the left-hand unit by means of a universal shaft connection generally indicated at 60. This connection allows movements of both units in a vertical plane which is transverse to direction of travel, and conformably to ground contours. Both cutter shafts are thus simultaneously driven from one and the same driving mechanism.

Figure 4:
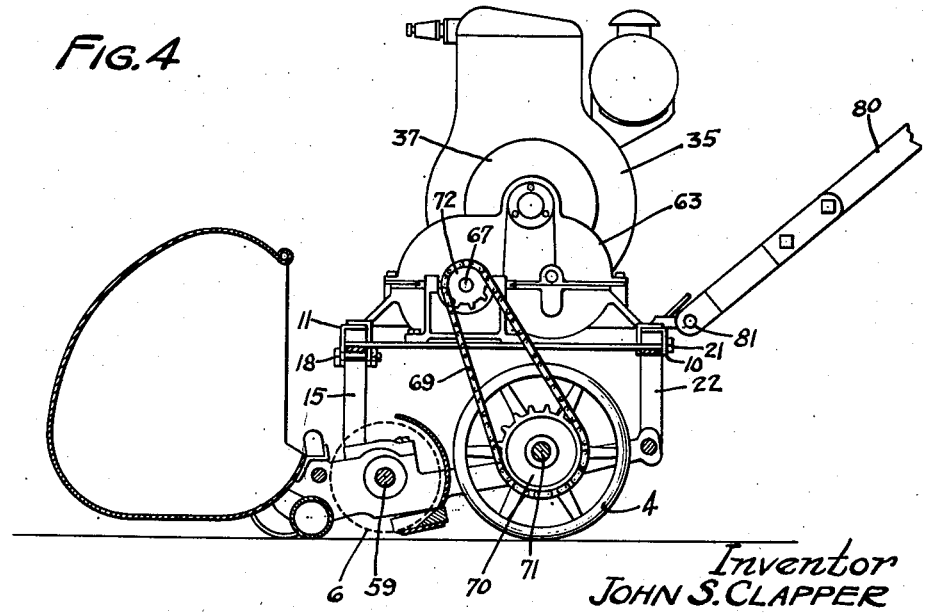
Figure 4 is a vertical cross-section approximately on line 4—4 of Figure 1.

Referring to Figures 1, 2 and 4: In a similar manner, the rolling supports or drums are simultaneously driven from the motor by a single driving mechanism which includes the clutch 37 having one element keyed to the drive shaft 38 of the motor and having the other element splined on shaft 62. This shaft connects with suitable reduction gearing, not shown, but contained in housing 63. The reduction gearing includes shaft 64, see Figure 2, which is connected by a universal joint 65 to a sleeve 66 to which is splined a shaft 67 mounted in bearing 68 of a construction similar to bearing 46, shown in Figure 13. Referring to Figure 4: Shaft 67 has a sprocket wheel 72 connected by chain 69 with sprocket 70 of shaft 71 of the rolling support or drum 4 of the left-hand unit. Referring to Figure 6: This drum shaft 71 is connected by a universal shaft 75 with the shaft 76 of the right-hand drum 4. The connections 30—31, 60 and 75 lie substantially in the same horizontal plane and the pivotal joints of these members are substantially aligned in direction of travel of the units.

Referring to Figures 2 and 5: Those parts of the drive means which are disposed outwardly beyond bracket 73 and gear housing 63, are provided with universal and slip joints. The shaft 43, as well as the chains are all supported by the units. The universal splined connections are above the pivotal points of the units with the frame. The driven elements, drums and cutters, are below these points, as are the universal drive shafts between cutters and drums. Each drum has the usual ratchet mechanism, not shown, by which it is driven from the shaft, but allows free rotation of the drum in non-driving direction.

For convenience, I have used the expressions "universal drive shaft" and "universal connection". By these expressions, I mean any connection which will allow relative motions between the driving and driven shafts to permit adjustment of the units conformably to ground contour and yet obtain proper driving action of one shaft by the other. In this invention the function of these devices is to allow movements of the units in a vertical plane relatively to one another and relative to the driving connection between the motor and the reels and the drums. It is possible that other constructions would provide functionally equivalent devices for my purpose and these are intended to be covered by the claims.

A feature of this invention relates to the use of only two mowers transversely aligned, as shown. This is particularly advantageous for mowers used for cutting putting greens, because two mowers alone are much easier to turn at the end of the cut. Cutting is normally accomplished by going back and forth on the green in opposite directions. Reversal in direction of mower travel for alternate swaths is considered an advantage over a series of swaths cut in one direction, and it is intended herein to claim the method in which two mowers are used to cut alternate swaths by motion in opposite directions throughout the whole width of the green.

I also believe it is new to apply power to the outer end of a cutter or drum shaft on one unit, and take off power for a second unit at the opposite end of the same shaft, and also believe it new to use a universal joint as a coupling between the inner ends of the units so driven that the units may rise and fall independently conformably to ground contours. I also believe it new to have a through drive including consecutively arranged axially aligned driving elements in two series, each including a chain or equivalent endless driving element. Another feature is the arrangement of the drive with two clutches, one arranged at each opposite side of the motor. A feature is the scheme of holding units in transverse alignment, accomplished by using two links in conjunction with the slidable and pivotal connections of the units with the upper frame.

The invention is herein embodied in a walk type implement and, therefore, the clutch and throttle controls are mounted on a steering handle. Although there is no intention to entirely limit the invention, this feature and its details are claimed. Referring to Figures 8 and 11: The steering bar is indicated at 80 and this is pivotally connected to the frame as at 81 for motion in a vertical plane. At the end of the steering bar 80 is a handle bar 82 having at each end a sleeve 83 rotatable thereon. These sleeves are adapted to be grasped by the hands of the operator to control steering, and through suitable mechanism they control clutch operation. Each control mechanism is a substantial duplicate of the other and includes an arm 84 on the sleeve 83, a rod 86 connects the arm with a bellcrank lever 87 pivoted on the frame element 10. The opposite end of the bellcrank lever is connected by a rod 88 with the outer end of a clutch lever 89 pivoted as at 90 to an extension of the frame. The outer end of this lever is forked and engages pins 91 carried by the outer slidable member of the clutch. This outer member is urged to clutch position by a spring 92.

Throttle control means for the engine is generally indicated at 95 and includes an element 96 arranged near the handle bar 82 so as to be easily accessible. This mechanism has not been shown in detail because it forms no part of the invention except that its terminal operating element is arranged near the sleeves 83 so that all these elements are easily accessible for control by the operator as he steers. A suitable yielding connection has been provided at 97 between the steering bar 80 and the engine block.

Another feature of the invention relates to means attachable to the mowing implement to raise the cutters from the ground when it is desired to transport the implement from one green to another. This feature is not only applicable to the two unit variety of gang mower here illustrated, but also to single unit mowers, particularly of the power type. Where such mowers are employed on putting greens, the transportation from one green to the next is a serious matter, because of the low adjustment for the cutting height that is employed while mowing, the delicate cutting edges and fine adjustment of the knives, and the rough terrain that has to be traversed between greens.

Referring now to Figures 9 and 10: Figure 9 shows the device in use and this device comprises a bar 100 having a swiveled rolling element 101 at its outer end. This rolling element preferably has a tire indicated at 102. The rolling element 101 and the two drums of the mowers form a three-roller support for the device, with the rolling supports related as the corners of a triangle, and the bar 100 is quickly attachable to or detachable from the implement in a manner to raise the cutters to the inoperative position shown. The bar 100 is provided near its inner end with a clip 103 forming with the top side of the bar a socket which receives a cross-member 104 supported by the cross-members 12. A second cross-member is indicated at 105 and lies above and is engaged by the clip 103, as shown. The bar 100 engages another cross member 106 arranged beneath the angle iron 11. The bar 100 has a lever pivoted on its side at 107, said lever having a hook or head 108 which engages on the top of the bar 11, as shown. The lever has a long arm 112 which can be preliminarily sprung laterally, and which is adapted to be engaged with a stop 113. In applying the device, the lever having been moved to the dotted line position of Figure 9, the bar is shoved inwardly to cause the element 104 to engage the socket. The lever is then flexed to the dotted line position of Figure 10 and, after being brought to the full line position of Figure 9, is released to spring to the position of Figure 10.

I claim as my invention:

1. A mowing implement comprising a pair of mower units aligned in direction transverse to their direction of travel, and each having a cutter and rolling support, a frame, means separately attaching each unit to the frame to rock in a vertical plane which is transverse to the direction of travel, and means for each unit yieldably supporting said frame and permitting each unit to rock in a vertical plane parallel to the direction of travel; one of said attaching means being formed to permit sliding of the unit also in direction transverse to the direction of travel, a motor on the frame and means by which the motor drives the rolling supports and the cutters.

2. A mowing implement comprising a pair of mower units aligned in a direction transverse to the direction of travel, and each having a cutter and a rolling support, a frame, means separately attaching each unit to the frame to substantially only rock in a vertical plane which is transverse to the direction of travel, one of said attaching means being formed to permit sliding of the unit also in that transverse direction, means connecting the units to allow them to swing in said vertical plane, but to hold them square with the direction of travel, a motor on the frame, and means by which the motor separately drives the rolling supports and cutters.

3. A mowing implement comprising a pair of mower units aligned in direction transverse to their direction of travel, each unit having a rolling support and a cutter, a frame, means separately attaching each unit to the frame to rock in a vertical plane which is transverse to the direction of travel, one of said attaching means being formed to permit sliding of the unit also in direction transverse to the direction of travel, a motor on the frame, means by which the motor drives both rolling supports, one rolling support through the other, and drives both cutters, one cutter through the other.

4. A mowing implement comprising a pair of mower units aligned in direction transverse to their direction of travel, each unit having a rolling support and a cutter, a frame, means separately attaching each unit to the frame to rock in a vertical plane which is transverse to the direction of travel, one of said attaching means being formed to permit sliding of the unit also in direction transverse to the direction of travel, a motor on the frame, means by which the motor drives the rolling supports and cutters including connections which maintain the driving condition while the units adjust themselves to ground contours, means between the units by which the driving of the rolling support of one unit drives the rolling support of the other and similar means for the cutters, both of the last mentioned means including shaft connections at the inner sides of the cutters which permit independent swinging movements of either unit in a vertical plane which is transverse to the direction of travel.

5. A mowing implement comprising two mower units spaced and aligned in a direction transversely to their direction of travel each unit having a rolling support and a cutter, a frame, means connecting each unit to the frame to permit independent motions of the unit conformably to ground contours, a motor on the frame, driving means connecting one side of the motor with the outer end of one of the cutters, means connecting the opposite side of the motor with the outer end of the rolling support of the other unit, each driving means including means which allows motions of the units in a vertical plane which is transverse to the direction of travel, a shaft connecting the inner end of one cutter with the inner end of the other to allow motions of the units in a vertical plane which is transverse to the direction of travel, a shaft connection between the inner ends of the rolling supports for a similar purpose, and links connecting the inner ends of the units respectively forwardly and rearwardly of the aforementioned shafts and allowing movement of the units in a vertical plane which is transverse to the direction of travel, said shafts and said links lying substantially in the same plane.

6. A mowing implement comprising only two mower units spaced and aligned in a direction transversely to their direction of travel each unit having a rolling support and a cutter, a universal drive shaft operably connecting the inner ends of the cutters, a universal drive shaft similarly connecting the inner ends of the rolling supports, a frame, means connecting each unit to the frame to permit independent motions of the units conformably to ground contours, a motor on the frame, driving means connecting one side of the motor with the outer side of one of the cutters, driving means connecting the opposite side of the motor with the outer end of the rolling support of the other unit, each driving means including, a universal connection which lies above the aforesaid means which connects the unit to the frame.

7. A mowing implement comprising only two mower units spaced and aligned in a direction transversely to their direction of travel each unit having a rolling support and a cutter, a universal drive shaft operably connecting the inner ends of the cutter, a universal drive shaft similarly connecting the inner ends of the rolling supports, a frame, means connecting each unit to the frame to permit independent motions of the unit conformably to ground contours, a motor on the frame, driving means connecting one side of the motor with the outer side of one of the cutters, driving means connecting the opposite side of the motor with the outer end of the rolling support of the other unit.

8. A mowing implement comprising a pair of mower units aligned in direction transverse to their direction of travel, a frame, means connecting one of the units to the frame for movement in a direction transverse to the direction of travel of the unit, and for rocking movement in a vertical plane conformably to ground contours, and upwardly toward the frame, and means yieldably resisting such motions, means connecting the other unit to rock in a similar plane, and to move upwardly, and means yieldably resisting such motions, and means cross-connecting the inner ends of the units at the front and rear to permit swinging motion of each unit in a vertical plane but to hold the units square with the direction of travel.

9. A mowing implement comprising a pair of mower units aligned in direction transverse to their direction of travel, a frame, means connecting one of the units to the frame for movement in a direction transverse to the direction of travel of the unit and for rocking movement in a vertical plane conformably to ground contours, means connecting the other unit for rocking movement in a similar plane, means cross-connecting the inner ends of the units at the front and rear to permit swinging motion of each unit in a vertical plane but to hold the unit square with the direction of travel, each unit having a cutter and a supporting drum, a motor on the frame, and means by which the motor separately drives the drums and the cutters, including universally jointed and splined shafts arranged above the level of the connections between the frame and the units for permitting motions of the units conformably to ground contours.

10. A mowing implement comprising a pair of mower units, each having a driving drum and a cutter, a frame, means for each unit connecting it to the frame to permit independent movement of the unit conformably to ground contours, a motor carried by the frame, separate first means by which the motor drives both rolling supports independently of the cutters, separate second means by which the motor drives both cutters independently of the roller supports, both driving means including a clutch for controlling power transmission by the motor, the first driving means including a universal shaft connection between the inner ends of the rolling supports, the second driving means including a similar connection between the cutters.

11. A mowing implement comprising a pair of mower units each having a rolling support and a cutter, spacing means for the units, means for each unit connecting it to the spacing means to permit independent movement of the unit conformably to ground contours, a motor carried by the spacing means, separate first means by which the motor drives both rolling supports independently of the cutters, and separate second means by which the motor drives both cutters independently of the rolling supports.

12. A mowing implement comprising a pair of mower units each having a rolling support and a cutter, a frame, means for each unit connecting it to the frame to permit independent movement of the unit conformably to ground contours, a motor carried by the frame, separate first means by which the motor drives both rolling supports independently of the cutters, and separate second means by which the motor drives both cutters independently of the rolling supports.

13. A mowing implement comprising a pair of mower units each having a rolling support and a cutter, spacing means for the units, means for each unit connecting it to the spacing means to permit independent movement of the unit conformably to ground contours, a motor carried by the spacing means, separate first means by which the motor drives both rolling supports independently of the cutters, and separate second means by which the motor drives both cutters independently of the rolling supports, said first driving means including a clutch for controlling power transmission by the motor and said second driving means including a clutch for a similar purpose.

14. A walk type of mowing implement comprising a pair of mower units each having a rolling support and a cutter, a frame, means for each unit connecting it to the frame to permit independent movement of the unit conformably to ground contours, steering means for the implement including a pair of rotatable sleeves adapted to be grasped by the hands for steering, a motor carried by the frame, separate first means by which the motor drives both rolling supports independently of the cutters, and separate second means by which the motor drives both cutters independently of the rolling supports, said first driving means including a first clutch for controlling power transmission by the motor and said second driving means including a second clutch for a similar purpose, means by which one sleeve when rotated controls the first clutch, and means by which the other sleeve similarly controls the second clutch.

15. A mowing implement including a pair of mowing units each having a rolling support and a cutter, said units being aligned transversely of their line of travel and means detachably secured to the implement in a manner to raise the cutters to an inoperative position and having a rolling element which acts with the rolling elements of the unit to provide a rolling support for the implement.

16. A mowing implement including only two mowing units each having a rolling support and a cutter, said units being aligned transversely of their line of travel and being connected to the frame, the cutter being displaced from the rolling support in direction of travel, and an arm detachably connected to the frame and having a rolling support which acts to raise the cutters to an inoperative position and acts with the rolling supports of the units to provide rolling support for the implement.

17. In a gang mower comprising a plurality of mower units laterally spaced from each other along a line substantially transversely to the direction of movement of said gang, a frame entirely supported on said laterally spaced mowing units, front and rear rolling supports for each of said units, front and rear connections from the frame to each unit whereby the units are maintained substantially in transverse alignment, and vertically elastic means cooperating with one of said connections to each unit whereby the front or rear support of either unit may independently move vertically without appreciable resistance by said frame.

18. In a gang mower comprising a plurality of mower units laterally spaced from each other along a line substantially transverse to the direction of movement of said gang, a frame entirely supported on said laterally spaced mowing units, front and rear rolling supports for each of said units, front and rear connections from the frame to each unit whereby the units are maintained substantially in transverse alignment, one of said connections to each unit being formed to permit limited vertical motion, and elastic means for each vertically movable connection normally supporting the frame at the upper limit of said motion but yieldable to permit vertical movement of the front or rear support of a unit independently of the other supports of said units.

19. A walk type mower having a rolling support and cutting elements disposed forwardly of the support, a guiding handle extending rearwardly of the support, an arm detachably secured to the mower extending forwardly of the cutting elements, and a castor with rolling element engaging said arm and supporting the cutting elements in inoperative position off from the ground whereby the said handle is adapted for steering the mower upon its ground support with the cooperation of said castor.

20. A mowing implement comprising a pair of mower units aligned in direction transverse to their direction of travel, and each having a cutter and rolling support, a frame entirely supported by said transversely aligned mower units, means separately attaching each unit to the frame to rock in a vertical plane which is transverse to the direction of travel, and means for each unit yieldably supporting said frame and permitting each unit to rock in a vertical plane parallel to the direction of travel, a motor on the frame and means by which the motor drives the rolling supports and the cutters.

21. A mowing implement comprising a pair of mower units aligned in a direction transverse to the direction of travel, and each having a cutter and a rolling support, a frame entirely supported by said units, means separately attaching each unit to the frame to substantially only rock in a vertical plane which is transverse to the direction of travel, means connecting the units to allow them to swing in said vertical plane, but to hold them square with the direction of travel, a motor on the frame, and means by which the motor separately drives the rolling supports and cutters.

22. A walk type gang mower comprising a gang frame with a guiding handle extending rearwardly therefrom, a plurality of mowing units beneath the gang frame and disposed transversely to the direction of travel, each unit comprising a unit frame with a cutter and a ground rolling element connected thereto on an axis displaced from the cutter, and with a ground support adjacent to the cutter, vertically resilient gang frame supporting means extending from each unit frame to said gang frame and adapted to permit rocking of each unit relatively to the gang frame in vertical planes or rocking of the gang frame, and limiting means operative between the gang frame and each unit, whereby rocking of the gang frame in a direction of travel, relative to each unit is limited, and whereby each of said units can be tipped to raise the cutter from the ground upon vertical movement of said guiding handle.

23. A power lawn mower comprising a frame, ground rolling elements transversely aligned and connected to support the frame, cutting elements revoluble on an axis parallel to the ground rolling elements and connected to be displaced in a direction of travel therefrom, a motor on said frame having a power shaft parallel to the ground rolling elements, power transmitting means including a clutch connected from one end of said power shaft to the rolling elements, and other power transmitting means including a clutch connected from the other end of said power shaft to the cutting elements.

24. A mower having a frame with a rolling support and a cutter displaced from the support in a direction corresponding to the direction of travel during cutting, and means detachably secured to the frame and extending beyond the cutter in a direction corresponding to the direction of travel during cutting, a caster wheel mounted on the extending portion of said detachable frame for carrying the frame and cutter in elevated positions out of contact with the ground.

JOHN S. CLAPPER.